United States Patent
Zhou et al.

(10) Patent No.: US 11,405,250 B2
(45) Date of Patent: Aug. 2, 2022

(54) AUTOMATICALLY SELECT GUARD INTERVAL VALUE

(71) Applicant: Hewlett Packard Enterprise Development LP, Houston, TX (US)

(72) Inventors: Qiang Zhou, Santa Clara, CA (US); Xuguang Jia, Beijing (CN); Jianpo Han, Beijing (CN); Guangzhi Ran, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/753,282

(22) PCT Filed: Oct. 23, 2017

(86) PCT No.: PCT/CN2017/107322
§ 371 (c)(1),
(2) Date: Apr. 2, 2020

(87) PCT Pub. No.: WO2019/079935
PCT Pub. Date: May 2, 2019

(65) Prior Publication Data
US 2020/0336349 A1      Oct. 22, 2020

(51) Int. Cl.
*H04W 84/12*      (2009.01)
*H04L 27/26*      (2006.01)
(Continued)

(52) U.S. Cl.
CPC ...... *H04L 27/2607* (2013.01); *H04L 27/2646* (2013.01); *H04W 4/70* (2018.02); *H04W 64/006* (2013.01); *H04W 84/12* (2013.01)

(58) Field of Classification Search
CPC .... H04L 27/2607; H04W 4/70; H04W 64/006
See application file for complete search history.

(56) References Cited

U.S. PATENT DOCUMENTS

| | | | |
|---|---|---|---|
| 8,416,864 B2 | 4/2013 | Korobkov et al. | |
| 9,294,323 B2 | 3/2016 | Zhang | |
| (Continued) | | | |

FOREIGN PATENT DOCUMENTS

CN      101026446      8/2007

OTHER PUBLICATIONS

Guard interval (802.11 n/acfax). (Web Page), Retrieved Aug. 17, 2017, 2 Pgs.
(Continued)

*Primary Examiner* — Samina F Choudhry
(74) *Attorney, Agent, or Firm* — Hewlett Packard Enterprise Patent Department (57) ABSTRACT

In one example in accordance with the present disclosure, a device may include a processor to detect a distance between a first location of the device and a second location of a peer device, automatically select one value for GI from at least two available values based on the detected distance, and update the value of GI using the selected value. A method may include detecting a distance between a first location of the AP and a second location of a peer device, selecting one value for GI from at least two available values based on the detected distance, and updating the value of GI using the selected value.

13 Claims, 8 Drawing Sheets

(51) Int. Cl.
*H04W 4/70* (2018.01)
*H04W 64/00* (2009.01)

(56) References Cited

U.S. PATENT DOCUMENTS

| | | |
|---|---|---|
| 9,374,245 B2 | 6/2016 | Garrett et al. |
| 2004/0213145 A1* | 10/2004 | Nakamura ............ H04L 5/0016 370/208 |
| 2004/0264431 A1* | 12/2004 | Rhodes ............... H04L 27/2607 370/343 |
| 2009/0141818 A1 | 6/2009 | Hiramatsu et al. |
| 2014/0192846 A1 | 7/2014 | Hassan et al. |
| 2015/0365263 A1* | 12/2015 | Zhang ................... H04L 5/0007 375/295 |
| 2017/0201364 A1 | 7/2017 | Wang et al. |
| 2018/0048427 A1* | 2/2018 | Lou ..................... H04L 61/6022 |

OTHER PUBLICATIONS

International Searching Authority, The International Search Report and the Written Opinion, dated Jun. 28, 2018, PCT/CN2017/107322, 9 Pgs.

* cited by examiner

AUTOMATICALLY SELECT GUARD INTERVAL VALUE

BACKGROUND

Guard Interval (GI) used in IEEE 802.11 Standard is provided to ensure that distinct transmissions in a wireless local area network (WLAN) do not interfere with one another. In some cases, the interference between the distinct transmissions cannot be constantly prevented by GI with a fixed value, such that the Radio Frequency (RF) link quality in the wireless system is difficult to be maintained at a proper ratio.

DETAILED DESCRIPTION

In order to ensure that distinct transmissions in the wireless local area network (WLAN) do not interfere with one another, the interference due to multipath reflections generated by distinct transmissions is desired to fall into GI in a high ratio. The portion of interference falling into GI can be prevented from affecting Orthogonal Frequency Division Multiplexing (OFDM) or Orthogonal Frequency Division Multiple Access (OFDMA) symbols outside GI. As the ratio of the interference falling into GI gets higher, the radio frequency (RF) link quality in the WLAN is better.

The ratio of the interference falling into GI is influenced by not only the value of GI, but also the distance among the wireless devices or the length of a transmission path among the wireless devices. If the value of GI is configured to be fixed, the interference falling into GI cannot be ensured to be a proper ratio, when the distance among wireless devices or the length of a transmission path among the wireless devices changes, due to the movement of the wireless device.

For example, in IEEE 802.11ax standard, three available values are provided for GI, e.g., 0.8 μs, 1.6 μs, and 3.2 μs, but only one of the three values can be chosen and manually configured to be the fixed value of GI. However, when the wireless device moves such that the distance among the wireless devices or the length of a transmission path among the wireless devices changes, the value configured as the fixed value of GI cannot change without manually reconfiguring, and it is possible for the interference to fall outside GI in a higher ratio with respect to a pre-expected ratio, such that the symbols outside GI may be affected by the interference.

Similarly, in IEEE 802.11n standard, two available values are provided for GI, e.g., 0.4 μs and 0.8 μs, and the value of GI can be manually configured by one of the two values, such that it is also possible for the interference to mostly fall outside GI and affect the symbols outside GI, when the distance among the wireless devices or the length of a transmission path among the wireless devices changes.

Although the fixed value of GI can be manually reconfigured, it is difficult for the manual reconfiguration to keep up with the change of the distance among the wireless devices or the length of a transmission path among the wireless devices, especially for an outdoor deployment in which the wireless device moves frequently and/or moves at a high speed.

Accordingly, in the examples herein, the distance among wireless devices or the length of a transmission path among the wireless devices can be detected or estimated. The value of GI can be automatically tunable according to the detected or estimated distance among wireless devices, or the length of a transmission path among the wireless devices. That is, the value of G may be automatically tuned among a plurality of standard specified GI values (e.g., among the three values 0.8 μs, 1.6 μs and 32 μs for IEEE 802.11ax standard, or between the two values 0.4 μs and 0.8 μs for IEEE 802.11n standard) based on the change of the distance among the wireless devices or the length of a transmission path among the wireless devices.

In other words, the tuning of the value of GI may not be limited by the manual configuration and may be released real-time to meet the distance among wireless devices or the length of a transmission path among the wireless devices.

When providing a fixed value for GI, the interference falling into GI can be maintained at a proper ratio, even if the distance among the wireless devices or the length of a transmission path among the wireless devices changes, whenever the change is frequent and/or at a high speed. Moreover, the transmission rate in the WLAN cannot be compromised due to a large value of GI being configured.

In one example, a device comprising a processor to detect a distance between a first location of the device and a second location of a peer device, to automatically select one of at least two values available to GI based on the detected distance, and to update the value of GI using the selected value. Further, processor is to notify the peer device to update the value of GI using the selected value, or the peer device may synchronously self-update the value of G. Both of the device and the peer device may be wireless devices, e.g. the device may be an access point (AP), and the peer device may be a mobile device or another AP.

In another example, a method for improving link quality comprises detecting, by a processor of an AP, a distance between a first location of the AP and a second location of a peer device. The method comprises automatically selecting, by the processor, one value for GI from at least two available values based on the detected distance. And, the method comprises updating, by the processor, the value of GI using the selected value. Further, the method may comprise notifying, by the processor, the peer device to update the value of GI using the selected value. Instead of notifying the peer device to update the value of GI using the selected value, the peer device may synchronously self-update the value of GI.

In another example, a non-transitory computer readable storage medium stores instructions that, when executed by a processor of an AP, causes the processor to detect a distance between a first location of the AP and a second location of a peer device, to automatically select one value for GI from at least two available values based on the detected distance, and to update the value of GI using the selected value. Further, the non-transitory computer readable storage medium may store instructions that, when executed by the processor, causes the processor to notify a peer device to update the guard interval using the selected value, or the peer device may synchronously self-update the value of GI.

As used herein, a "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like. As used herein, an "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

It is appreciated that examples described herein below may include various components and features. Some of the components and features may be removed and/or modified without departing from a scope of the device, method and non-transitory computer readable storage medium for improving link quality by automatically tuning the value of GI. It is also appreciated that, in the following description, numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example. As used herein, a component is a combination of hardware and software executing on that hardware to provide a given functionality.

Figure 1:
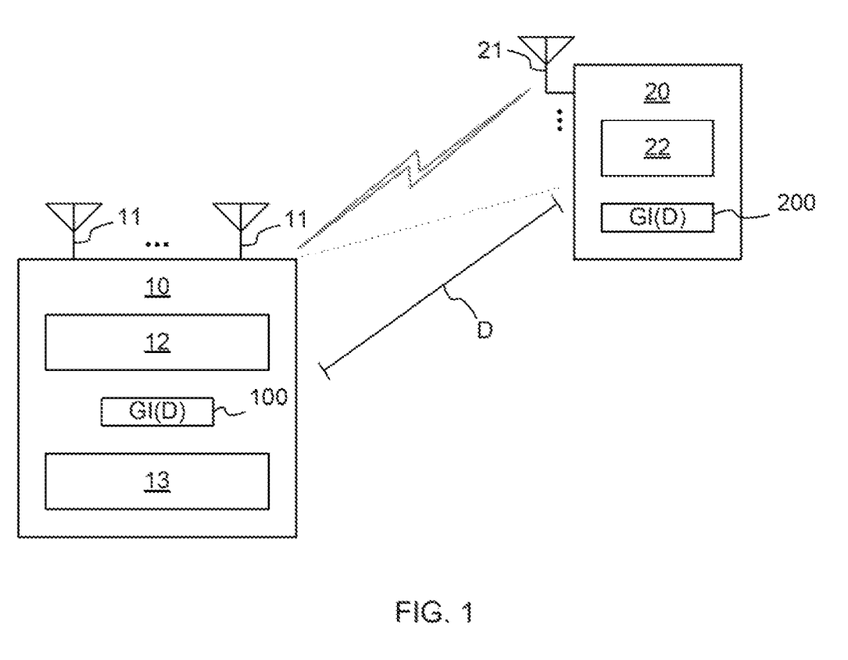
FIG. 1 is a block diagram illustrating an example wireless system including a wireless device capable of automatically selecting the value of GI according to the present disclosure.

FIG. 1 is a block diagram illustrating an example WLAN including a wireless device capable of tuning the value of GI according to the present disclosure. Referring to FIG. 1, a WLAN includes a device 10 and at least one mobile device 20. The device 10 may be an AP or any other device capable of transmitting wireless transmissions to and receiving wireless transmissions from the mobile device 20. The Mobile device 20 may be a smartphone, a mobile phone, a Personal Digital Assistant (PDA), a portable personal computer, an AIO (all-in-one) computing device, a notebook, a convertible or hybrid notebook, a netbook, a tablet, a cellular device, a desktop computer, a multimedia player, an entertainment unit, a data communication device, a portable reading device, or any other computing device capable of transmitting and receiving wireless transmissions. The symbols may be exchanged between the device 10 and the at least one mobile devices 20.

The device 10 includes at least one antenna 11 that may be coupled to a RF transceiver 12 for transmitting the wireless transmissions to and receiving the wireless transmissions from the mobile devices 20. The mobile device 20 also includes at least one antennas 21 that may be coupled to a RF transceiver 22 for transmitting the wireless transmissions to and receiving the wireless transmissions from the device 10.

The wireless transmission transmitted and received among the device 10 and the mobile device 20 may traverse in various radial directions, and reflect off walls, furniture, and other objects. Due to the reflections, multiple copies of the same wireless transmission may arrive at a receiver, each undergoing a different delay and attenuation—a phenomenon commonly referred to as "multipath." which can cause the interference.

The RF transceivers 12 and 22 can transmit and receive the wireless transmissions by utilizing GI. GI utilized by the RF transceivers 12 and 22 is automatically tunable based on a distance D between the device 10 and the mobile device 20, and may be regarded as a function GI(D) 100 or 200 correlated with the distance D.

Generally, the distance D may be the length of a path in multipath closest to a "direct path" of the wireless transmission. As used herein, the "direct path" of the wireless transmission may refer to a straight line joining the mobile device 20 and the device 10.

The device 10 may include a processor 13 capable of tuning the value of GI utilized by the RF transceiver 12 when transmitting and receiving wireless transmissions, according to the distance D. The value of GI utilized by the RF transceiver 22 may be also tuned by the processor 13, or synchronously self-updated by the mobile device 20. The processor 13 can be a hardware component and can execute instructions of a software component.

The processor 13 may detect or estimate the distance D between a first location of the device 10 and a second location of the mobile device 20 (regarded as a peer device of the device 10). The distance D may be detected or estimated based on a time delay or an energy loss during the wireless transmission.

For example, a Round-Trip Time (RTT) may be chosen as a time delay for detecting or estimating the distance D.

First, the device 10 can send out a distance measure request frame to the mobile device 20 and record the timestamp $T_{dreqssnd}$ when the frame being sent out.

Second, the mobile device 20 (regarded as a peer device by the device 10) can record the timestamp $T_{dreqrecv}$ when the measure request frame from the device 10 is received, and record the timestamp $T_{drspsend}$ when a measure respond frame is sent back to the device 10. And both $T_{dreqrecv}$ and $T_{drspsend}$ will be included in the measure respond frame.

Then, the device 10 records timestamp $T_{drsprecv}$ when the measure respond frame from the mobile device 20 is received, and extracts $T_{dreqrecv}$ and $T_{drspsend}$ from the received measure respond frame.

Accordingly, the processor 13 may calculate a frame transmission time $T_{distance}$ from equation (1) below.

$$T_{distance} = \frac{(T_{drsprecv} - T_{drspsend}) + (T_{drsprecv} - T_{drspsend})}{2}. \quad \text{Equation (1)}$$

With a simple mathematic transformation, two timestamps which are marked by a same wireless device (i.e. the device 10 or the mobile device 20) can be put together to decouple the time synchronization between different devices, and the above equation 1 may be transformed to be equation 2 below.

$$T_{distance} = \frac{(T_{drsprecv} - T_{drspsend}) + (T_{drspecv} - T_{drpsend})}{2}. \quad \text{Equation (2)}$$

Generally, as the speed of electrical wave is a constant value, the distance D between the device 10 and the mobile device 20 may be reflected by the calculated frame transmission time $T_{distance}$.

The processor 13 may tune the value of G among at least two available values $GI_1 \sim GI_n$ (n≥2), by selecting one value for GI from at least two available values $GI_1 \sim GI_n$, based on the detected distance D reflected by the transmission time $T_{distance}$.

Considering GI is used to protect the symbols in multi-path transmission, the most vulnerable case for one symbol is the difference value between the shortest path and the longest reflection path. If the difference value between the shortest path and the longest reflection path exceed the value of GI, GI seems impossible to protect the symbols and its value needs to be tuned.

As the distance D may be substantially the length of a path in multipath closet to a "direct path" of the wireless transmission, the detected or estimated distance D may be regarded as the shortest path, such that the transmission time $T_{distance}$ reflecting the distance D may be regarded as a shortest transmission time in real environment.

Accordingly, the value of GI may be tuned to be not less than a difference between the measured transmission time $T_{distance}$ and a pre-determined longest transmission time $T_{longest}$. That is, the selected value for GI from the at least two available values $GI_1 \sim GI_n$ is not less than a difference between the measured transmission time $T_{distance}$ and a pre-determined longest transmission time $T_{longest}$.

For example, when three available values 0.8 μs, 1.6 μs and 3.2 μs are provided for GI, as defined in the IEEE 802.11ax standard, the value of GI may be tuned as follows:

If $(T_{longest} - T_{distance}) < 0.8$ μs
GI=0.8 μs,
Else if $(T_{longest} - T_{distance}) < 1.6$ μs
GI=1.6 μs,
else,
GI=3.2 μs.

The pre-determined longest transmission time $T_{longest}$ may be obtained from experiences according to the deployment or estimated from some mathematic models.

Figure 2:
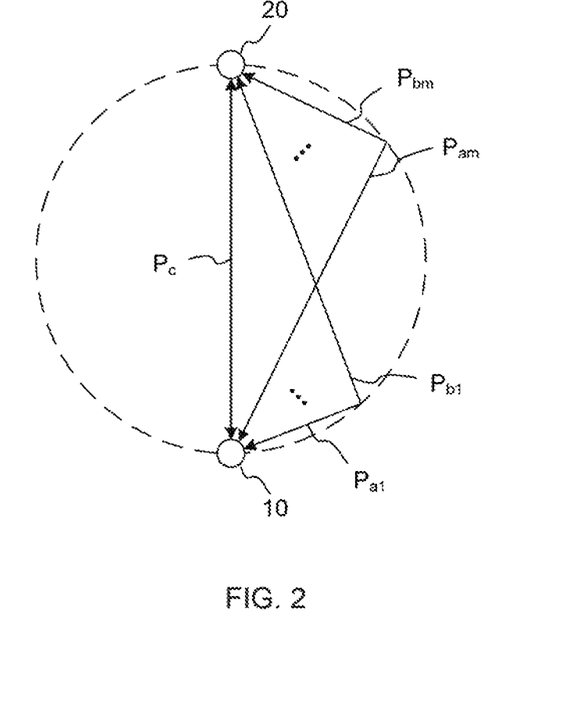
FIG. 2 is a diagram illustrating an example model for automatically selecting the value of GI according to present disclosure.

FIG. 2 is a diagram illustrating an example of a model for tuning the value of GI according to present disclosure. Referring to FIG. 2, in a created model, anyone of the device 10 and the terminal device 20 may stand for a sender, the other one of the device 10 and the terminal device 20 may stand for a receiver, and a circular curve represents the signal transmission range. Between the device 10 and the terminal device 20, there are a direct transmission path $P_c$ and a plurality of reflection transmission paths $P_{a1}+P_{b1} \sim P_{am}+P_{bm}$ (m>1).

If the difference between the reflection transmission path $P_{ai}+P_{bi}$ (1≤i≤m) and the direction transmission path $P_c$ is larger than V×GI (V is the speed of electromagnetic wave), i.e. $P_{ai}+P_{bi}-P_c > V \times GI$, multi-path transmission issue will be involved, such that the interference falls outside GI, and the RF link quality in the wireless system will be worse.

Accordingly, the max value of GI capable of protecting the symbols may meet the equation (3) below.

$$\text{Max}(P_{ai}+P_{bi}-P_c) \leq V \times GI. \quad \text{Equation (3):}$$

As the direction transmission path $P_c$ is a shortest transmission path, and the reflection transmission path $P_{ai}+P_{bi}$ is a longest shortest transmission path when $P_{si}=P_{bi}$, the equation (3) may be transformed to be the equation (4) below.

$$\text{Path}_{longest} - \text{Path}_{shortest} \leq V \times GI. \quad \text{Equation (4):}$$

Further, as the distance D may be substantially closest to the direct transmission path $P_c$, i.e. the $\text{Path}_{shortest}$ in the equation (4), by substituting the equation (5) below into the equation (4), the equation (4) may be transformed to be the equation (6) below.

$$T_{distance} = \frac{\text{Path}_{shortest}}{V}, \quad \text{Equation (5)}$$

$$GI \geq \frac{\text{Path}_{longest} - \text{Path}_{shortest}}{\text{Path}_{shortest}} \times T_{distance}. \quad \text{Equation (6)}$$

Therefore, the equation (6) may be used for determining the condition for tuning the value of GI, and the value of GI determined according to the equation (6) is no less than a transmission time associated with the distance times a ratio of (1) difference between a longest path $\text{Path}_{longest}$ and a shortest path $\text{Path}_{shortest}$, and (2) the shortest path $\text{Path}_{shortest}$.

Figure 3:
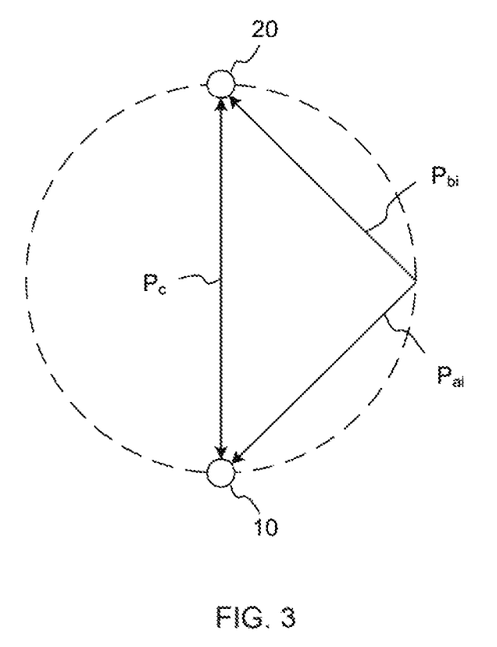
FIG. 3 is a diagram illustrating an example case of longest path in the model shown in FIG. 2 according to present disclosure.

FIG. 3 is a diagram illustrating a case of longest path in the model shown in FIG. 2 according to present disclosure. Referring to FIG. 3, when the length of the section $P_{ai}$ equals to the length of the section $P_{bi}$, the value of the difference between the reflection transmission path $P_{ai}+P_{bi}$ and the direction transmission path $P_c$ is largest. In the case of $P_{ai}=P_{bi}$, the condition of RF link quality in the wireless system is worst.

Accordingly, the equation (3) may be simplified to be the equation (7) or (8) below.

$$(\sqrt{2}-1)P_c \leq V \times GI, \quad \text{Equation (7):}$$

$$0.4 \times P_c \leq V \times GI. \quad \text{Equation (8):}$$

As the direction transmission path $P_c$ is a shortest transmission path, and the reflection transmission path $P_{ai}+P_{bi}$ is a longest shortest transmission path when $P_{ai}=P_{bi}$, the equations (7) and (8) may be transformed to be the below equations (9) and (10), respectively.

$$(\sqrt{2}-1)\text{Path}_{shortest} \leq V \times GI, \quad \text{Equation (9):}$$

$$0.4 \times \text{Path}_{shortest} \leq V \times GI. \quad \text{Equation (10):}$$

By substituting the equation (5) into the equations (9) and (10), the equations (9) and (10) may be transformed to be the equations (11) and (12), respectively.

$$GI \geq \frac{T_{distance}}{\sqrt{2}-1}, \quad \text{Equation (11)}$$

$$GI \geq 0.4 \times T_{distance}. \quad \text{Equation (12)}$$

Alternatively, the equation (12) may be transformed to be the below equation (13) for configuring at least one threshold $T_{thres}$ for transmission time $T_{distance}$, at least two pre-determined threshold sections may be established by the at least one threshold $T_{thres}$, and each threshold section corresponds to one of at least two values $GI_1 \sim GI_n$.

$$T_{thres}1\text{-}n=2.5 \times GI_1.\qquad\text{Equation (13):}$$

If the measured transmission time $T_{distance}$ falls into any of the at least two pre-determined threshold ranges, a corresponding one of at least two values $GI_1 \sim GI_n$ may be chosen to tune the value of GI.

For example, when three available values 0.81 µs, 1.6 µs and 3.2 µs are provided for GI, as defined in the IEEE 802.11ax standard, two thresholds $T_{thres1}$ and $T_{thres2}$ can be configured by utilizing the equation (13):

$$T_{thres1}=2.5\times 0.8\mu s=2\mu s,\text{ and}$$

$$T_{thres2}=2.5\times 1.6\mu s=4\mu s.$$

Accordingly, there will be three threshold ranges established by the two thresholds $T_{thres1}$ and $T_{thres2}$, i.e. [0 µs, 2 µs), [2 µs, 4 µs), and [4 µs, +∞), and the value of GI may be tuned as follows:

If $(T_{distance})<2$ µs, the transmission time $T_{distance}$ falls into the section [0 µs, 2 µs), $$GI=0.8\mu s,$$

Else if $(T_{distance})<4$ µs, the transmission time $T_{distance}$ falls into the section [2 µs, 4 µs), $$GI=1.6\mu s,$$

else, the transmission time $T_{distance}$ falls into the section [4 µs, +∞), $$GI=3.2\mu s.$$

After determining the selected value of GI, the processor 13 can update the value of GI, i.e. the function GI(D) 100, using the selected value. If necessary, the processor 13 notifies the mobile device 20 to update the value of GI, i.e. the function GI(D) 200, using the selected value.

Figure 4:
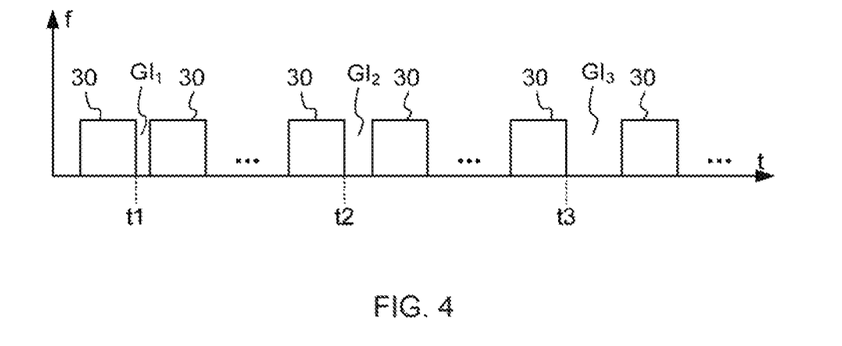
FIG. 4 is a diagram illustrating an example of automatically selecting the value of GI for meeting the change of the distance according to the present disclosure.

FIG. 4 is a diagram illustrating an example of tuning the value of GI for meeting the change of the distance according to the present disclosure. Referring to FIG. 4, take three available values $GI_1=0.8$ µs, $GI_2=1.6$ µs and $GI_3=3.2$ µs for example:

During the period t1~t2, the transmission time $T_{distance}$ falls into the section [0 µs, 2 µs), and the value of GI between the symbols 30 is tuned by the processor 13 to be $GI_1=0.8$ µs.

During the period t2~t3, the transmission time $T_{distance}$ falls into the section [2 µs, 4 µs), and the value of GI between the symbols 30 is tuned by the processor 13 to be $GI_2=1.6$ µs.

During the period after t3, the transmission time $T_{distance}$ falls into the section [4 µs, +∞), and the value of GI between the symbols 30 is tuned by the processor 13 to be $GI_3=3.2$ µs.

3 As can be seen, the value of GI may be tuned due to the change of the distance D reflected by the transmission time $T_{distance}$.

If there are more than one mobile devices 20 included in the wireless system, the values of GI corresponding to different mobile devices 20 are unnecessary to be the same.

Figure 5:
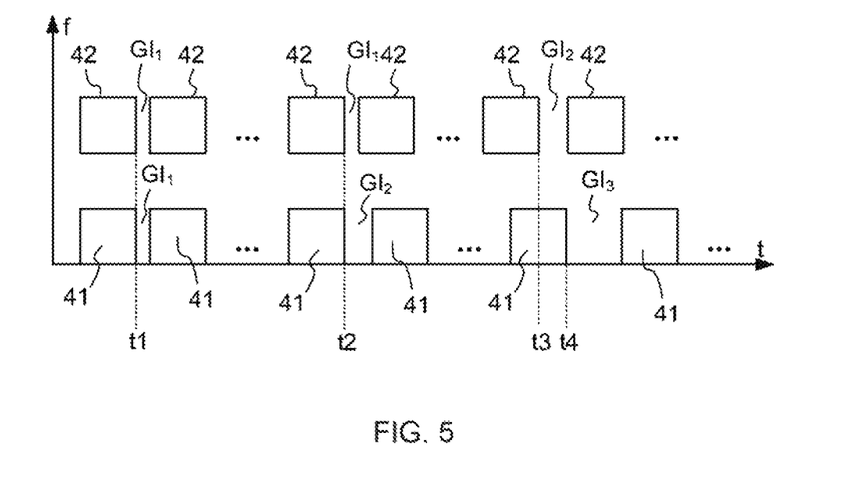
FIG. 5 is a diagram illustrating another example of automatically selecting the value of GI for meeting the change of the distance according to the present disclosure.

FIG. 5 is a diagram illustrating another example of tuning the value of GI for meeting the change of the distance according to the present disclosure. Referring to FIG. 5, take three available values $GI_1=0.8$ µs, $GI_2=1.6$ µs and $GI_3=3.2$ µs for example:

During the period t1~t2, the transmission time $T_{distance}$ between the device 10 and one of the mobile device 20 falls into the section [0 µs, 2 µs), and the value of GI between the symbols 41 of that mobile device 20 is tuned by the processor 13 to be $GI_1=0.8$ µs. Meanwhile, the transmission time $T_{distance}$ between the device 10 and another one of the mobile device 20 falls into the section [0 µs, 2 µs) also, and the value of GI between the symbols 42 of another mobile device 20 is tuned by the processor 13 to be $GI_1=0.8$ µs.

During the period t2~t3, the transmission time $T_{distance}$ between the device 10 and one of the mobile device 20 falls into the section [2 µs, 4 µs), and the value of GI between the symbols 30 is tuned by the processor 13 to be $GI_2=1.6$ µs. Meanwhile, the transmission time $T_{distance}$ between the device 10 and another one of the mobile device 20 still falls into the section [0 µs, 2 µs), and the value of GI between the symbols 42 of another mobile device 20 is also $GI_1=0.8$ µs and is not tuned by the processor 13.

During the period t3~t4, the transmission time $T_{distance}$ between the device 10 and one of the mobile device 20 still falls into the section [2 µs, 4 µs), and the value of GI between the symbols 30 is not tuned by the processor 13 and maintained to be $GI_2=1.6$ µs. Meanwhile, the transmission time $T_{distance}$ between the device 10 and another one of the mobile device 20 falls into the section [2 µs, 4 µs), and the value of GI between the symbols 42 of another mobile device 20 is tuned by the processor 13 to be $GI_2=1.6$ µs.

During the period after t4, the transmission time $T_{distance}$ falls into the section [4 µs, +∞), and the value of GI between the symbols 30 is tuned by the processor 13 to be $GI_3=3.2$ µs. Meanwhile, the transmission time $T_{distance}$ between the device 10 and another one of the mobile device 20 still falls into the section [2 µs, 4 µs), and the value of GI between the symbols 42 of another mobile device 20 is also $GI_2=1.6$ µs and is not tuned by the processor 13.

As can be seen, the values of GIs corresponding to different mobile devices 20 are unnecessary to be synchronized.

Alternatively, the above examples are also suitable for case of the peer device being another AP, i.e. the mobile device 20 in the above examples may be replaced by another AP different from the device 10 working as an AP, and the distance between a pair of APs may be also changeable.

Figure 6:
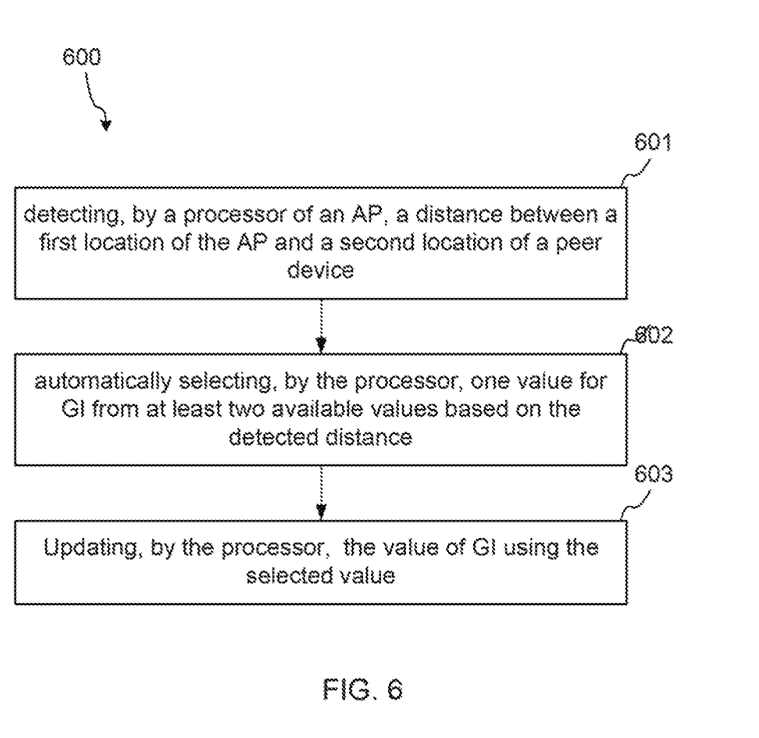
FIG. 6 is a flow chart illustrating an example method for improving link quality according to present disclosure.

FIG. 6 is a flow chart illustrating an example of a method for improving link quality according to present disclosure. Referring to FIG. 6:

The method 600 comprises detecting, by a processor of an AP, a distance between a first location of the AP and a second location of a peer device, at 601. In one example, the distance between the device and a peer device may be detected by measuring a transmission time among the device and the peer device.

The method 600 comprises automatically selecting, by the processor, one value for GI from at least two available values based on the detected distance, at 602. In one example, the selected value for GI may be not less than a difference between the measured transmission time and a pre-determined longest transmission time. In another example, the selected value for GI may meet the equation (6) mentioned above, or the selected value for GI may be the value corresponding to one of the pre-determined threshold section, into which the transmission time falls.

The method 600 comprises updating, by the processor, the value of GI using the selected value, at 603. In one example, the selected value may be one of 0.8 µs, 1.6 µs, 3.2 µs when the AP is compliant with the IEEE 802.11ax standard, and may be one of 0.4 µs and 0.8 µs when the AP is compliant with the IEEE 802.11n standard.

Figure 7:
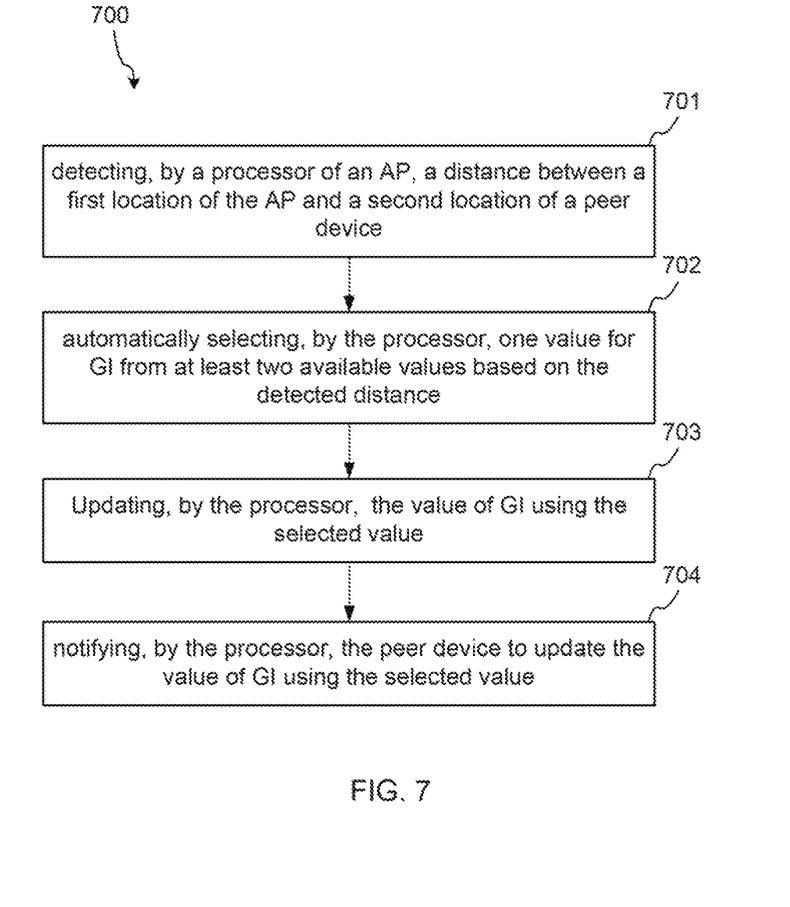
FIG. 7 is a flow chart illustrating another example method for improving link quality according to present disclosure.

FIG. 7 is a flow chart illustrating another example of a method for improving link quality according to present disclosure. Referring to FIG. 7:

The method 700 comprises detecting, by the processor of the AP, a distance between a first location of the AP and a second location of a peer device, at 701. Similarly to the method 600, the distance between the device and a peer device may be detected by measuring a transmission time among the device and the peer device.

The method 700 comprises automatically selecting, by the processor, one value for GI from at least two available values based on the detected distance, at 702. Similarly to the method 600, the selected value for GI may be not less than a difference between the measured transmission time and a pre-determined longest transmission time. Instead, the selected value for GI may meet the equation (6) mentioned above, or the selected value for GI may be the value corresponding to one of the pre-determined threshold section, into which the transmission time falls.

The method 700 comprises updating, by the processor, the value of GI using the selected value, at 703. The selected value may be one of 0.8 µs, 1.6 µs, 3.2 µs.

The method 700 comprises notifying, by the processor, the peer device to update the value of GI using the selected value, at 704.

Figure 8:
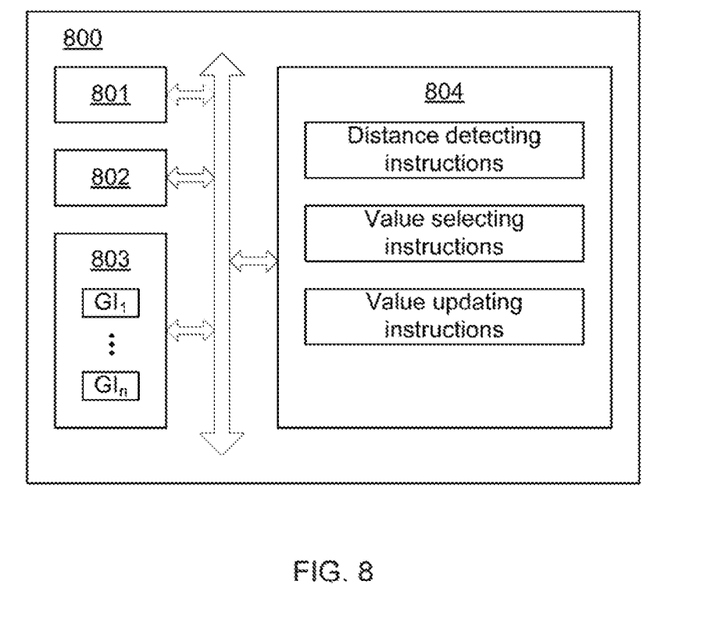
FIG. 8 is a schematic illustrating example components for implementing the device shown in FIG. 1 according to present disclosure.

FIG. 8 is a schematic illustrating an example of components for implementing the device, i.e. device 10, shown in FIG. 1 according to present disclosure. The component 800 includes a RF transceiver 801, a processor 802, a non-volatile or volatile memory 803 and/or a non-transitory computer readable storage medium 804.

The memory 803 stores at least two values $GI_1 \sim GI_n$ available to GI, which can be read by the RF transceiver 801. The non-transitory computer readable storage medium 804 stores instructions excitable for the possessor 802.

The instructions include distance detecting instructions, when executed by the processor 802, causes the processor 802 to detect a distance between a first location of the AP and a second location of a peer device, when executed by the processor 802.

The instructions include value selecting instructions, when executed by the processor 802, causes the processor 802 to automatically select one value for GI from at least two available values based on the detected distance.

The instructions include value updating instructions, when executed by the processor 802, causes the processor 802 to update the value of GI using the selected value. For example, the updated value of GI may be correctly read from the memory 803 by the RF transceiver 801.

Figure 9:
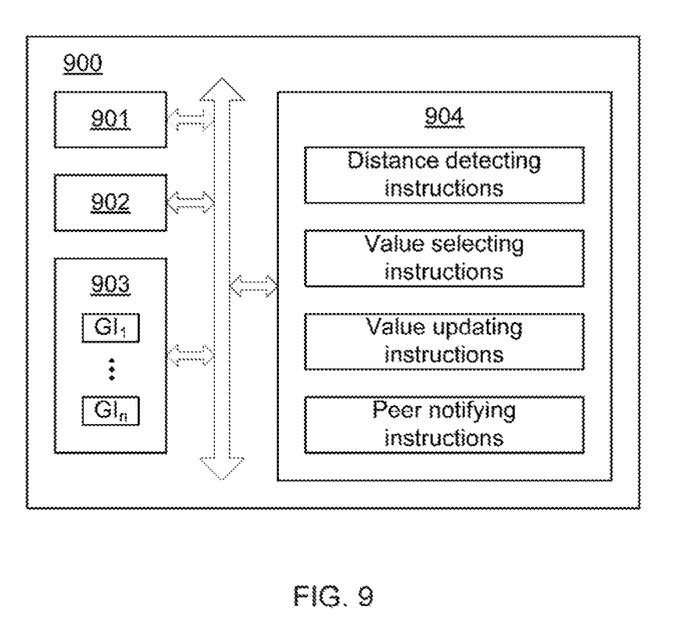
FIG. 9 is a schematic illustrating example components for implementing the device shown in FIG. 1 according to present disclosure.

FIG. 9 is a schematic illustrating another example of components for implementing the device, i.e. device 10 such as an AP, shown in FIG. 1 according to present disclosure. The component 900 includes a RF transceiver 901, a processor 902, a non-volatile or volatile memory 903 and/or a non-transitory computer readable storage medium 904.

The memory 903 stores at least two values $GI_1 \sim GI_n$ available to GI, which can be read by the RF transceiver 901. The non-transitory computer readable storage medium 904 stores instructions excitable for the possessor 902.

The instructions include distance detecting instructions, when executed by the processor 902, causes the processor 902 to detect a distance between a first location of the AP and a second location of a peer device, when executed by the processor 902.

The instructions include value selecting instructions, when executed by the processor 902, causes the processor 902 to automatically select one value for GI from at least two available values based on the detected distance.

The instructions include value updating instructions, when executed by the processor 902, causes the processor 902 to update the value of GI using the selected value. For example, the updated value of GI may be correctly read from the memory 803 by the RF transceiver 901.

The instructions include peer notifying instructions, when executed by the processor 902, causes the processor 902 to notify a peer device to update the value of GI using the selected value.

While the present disclosure has been described in connection with certain example embodiments, it is to be understood that the disclosure is not limited to the disclosed embodiments, but, on the contrary, is intended to cover various modifications and equivalent arrangements included within the spirit and scope of the appended claims, and equivalents thereof.

What is claimed is:

1. A device comprising:
   a processor;
   a memory storing instructions executed by the processor to perform the steps of:
   detect a distance between a first location of the device and a second location of a peer device;
   automatically select one value for Guard Interval (GI) from at least two available values based on the detected distance;
   update the value of GI using the selected value;
   wherein the distance between the device and a peer device is detected by measuring a transmission time of a packet transmitted between the device and the peer device;
   wherein the selected value for GI is no less than a transmission time associated with the distance multiplied by a ratio, the ratio comprising (1) a difference between a longest path representative of a reflection transmission path and a shortest path representative of a direction transmission path, and (2) the shortest path.

2. The device of claim 1, wherein the selected value for GI is not less than a difference between the measured transmission time and a pre-determined longest transmission time.

3. The device of claim 1, wherein the at least two available values include 0.8 µs, 1.6 µs and 3.2 µs when the device is compliant with the IEEE 802.11ax standard, and 0.4 µs and 0.8 µs when the device is compliant with the IEEE 802.11n standard.

4. The device of claim 1, wherein the instructions, when executed cause the processor to further:
   notify the peer device to update the value of GI using the selected value.

5. The device of claim 1, wherein the device comprises an access point (AP), and the peer device comprises a mobile device or another AP.

6. A method comprising:
   detecting, by a processor of an access point (AP), a distance between a first location of the AP and a second location of a peer device;
   automatically selecting, by the processor, one value for Guard Interval (GI) from at least two available values based on the detected distance;
   updating, by the processor, the value of GI using the selected value;
   wherein the distance between the AP and a peer device is detected by measuring a transmission time of a packet transmitted between the AP and the peer device;

wherein the selected value for GI is no less than a transmission time associated with the distance multiplied by a ratio, the ratio comprising (1) a difference between a longest path representative of a reflection transmission path and a shortest path representative of a direction transmission path, and (2) the shortest path.

7. The method of claim 6, wherein the selected value for GI is not less than a difference between the measured transmission time and a pre-determined longest transmission time.

8. The method of claim 6, wherein the at least two available values include 0.8 μs, 1.6 μs and 3.2 μs when the AP is compliant with the IEEE 802.11ax standard, and the at least two available values include 0.4 μs and 0.8 μs when the AP is compliant with the IEEE 802.11n standard.

9. The method of claim 6, further comprising:
notifying, by the processor, the peer device to update the value of GI using the selected value.

10. A non-transitory computer readable storage medium storing instructions that, when executed by a processor of an access point (AP), causes the processor to:
measure a transmission time of a packet transmitted between the AP and the peer device to detect a distance between a first location of the AP and a second location of a peer device;
automatically select one value for Guard Interval (GI) from at least two available values based on the detected distance; and
update the value of GI using the selected value, wherein the selected value for GI is no less than a transmission time associated with the distance multiplied by a ratio, the ratio comprising (1) a difference between a longest path representative of a reflection transmission path and a shortest path representative of a direction transmission path, and (2) the shortest path.

11. The non-transitory computer readable storage medium of claim 10, further storing instructions that, when executed by the processor, causes the processor to:
notify a peer device to update the guard interval using the selected value.

12. The non-transitory computer readable storage medium of claim 11, wherein the selected value for GI is not less than a difference between the measured transmission time and a pre-determined longest transmission time.

13. The non-transitory computer readable storage medium of claim 10, wherein the at least two available values include 0.8 μs, 1.6 μs and 3.2 μs when the device is compliant with the IEEE 802.11ax standard, and 0.4 μs and 0.8 μs when the device is compliant with the IEEE 802.11n standard.

* * * * *